(12) United States Patent
Song

(10) Patent No.: US 8,570,858 B2
(45) Date of Patent: Oct. 29, 2013

(54) CONTROL METHOD FOR PROTECTING FAILURE RECOVERY OF ETHERNET RING AND ETHERNET RING NODES

(75) Inventor: Xiaoli Song, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 293 days.

(21) Appl. No.: 13/119,568

(22) PCT Filed: Aug. 24, 2009

(86) PCT No.: PCT/CN2009/073458
§ 371 (c)(1),
(2), (4) Date: Mar. 17, 2011

(87) PCT Pub. No.: WO2010/031296
PCT Pub. Date: Mar. 25, 2010

(65) Prior Publication Data
US 2011/0173489 A1    Jul. 14, 2011

(30) Foreign Application Priority Data

Sep. 22, 2008   (CN) .......................... 2008 1 0149690

(51) Int. Cl.
*H04L 12/26* (2006.01)
(52) U.S. Cl.
USPC ............ 370/221; 370/217; 370/225; 370/248
(58) Field of Classification Search
USPC .................. 370/216, 222, 228, 400; 710/100; 714/717
See application file for complete search history.

(56) References Cited

U.S. PATENT DOCUMENTS

| 7,003,705 | B1 * | 2/2006 | Yip et al. | 714/717 |
|---|---|---|---|---|
| 7,606,240 | B1 * | 10/2009 | Shah | 370/400 |
| 2003/0165119 | A1 | 9/2003 | Hsu et al. | |
| 2003/0208618 | A1 | 11/2003 | Mor et al. | |
| 2006/0245351 | A1 * | 11/2006 | Pande et al. | 370/216 |
| 2009/0016214 | A1 * | 1/2009 | Alluisi et al. | 370/228 |
| 2009/0216923 | A1 * | 8/2009 | Errickson et al. | 710/100 |

FOREIGN PATENT DOCUMENTS

| CN | 1905490 A | 1/2007 |
|---|---|---|
| CN | 1980145 A | 6/2007 |
| WO | 03077459 A2 | 9/2003 |

OTHER PUBLICATIONS

International Search Report for PCT/CNO9/073459 dated Nov. 18, 2009.

* cited by examiner

*Primary Examiner* — Brian D Nguyen
*Assistant Examiner* — Toan Nguyen
(74) *Attorney, Agent, or Firm* — Banner & Witcoff, Ltd.

(57) ABSTRACT

The present invention discloses a method for controlling failure recovery of Ethernet loop protection and an Ethernet loop node. The method comprises: when a node adjacent to a failed link detects recovery of the link, blocking a port just recovered, setting the port to be in a pre-forwarding state and starting a timer, and releasing the port temporarily blocked if the node adjacent to the failed link has not received a control protocol message sent by a master node during a timing period of the timer, and transferring the port from the pre-forwarding state to a forwarding state. The present invention allows a port of a node adjacent to a recovered link to enter into a forwarding state from the pre-forwarding state as early as possible on the premise that a corresponding control protocol message is unable to be received in time.

9 Claims, 3 Drawing Sheets

CONTROL METHOD FOR PROTECTING FAILURE RECOVERY OF ETHERNET RING AND ETHERNET RING NODES

TECHNICAL FIELD

The present invention relates to an Ethernet loop protection system, and more particularly, to a method for controlling failure recovery of Ethernet loop protection and an Ethernet loop node.

BACKGROUND OF THE RELATED ART

At present, an Ethernet loop architecture is widely used in both metropolitan area network and Intranet to improve the reliability of the network. One loop corresponds physically to a loop-connected Ethernet topology, which is a group of Ethernet switchers connected with each other into a loop. The Ethernet loop protection protocol defines the role of each node in the loop respectively. A master node is a main decision-making and control node in the loop. There should be one and only one master node in each loop. All the other nodes except the master mode in the loop are transmission nodes. Each node uses a control Virtual Local Area Network (VLAN) to transmit protocol messages, and cooperates with each other to protect the loop, and uses a protection VLAN to transmit data messages such that the data messages and the control messages are separated from each other by different VLANs. When one link in the loop is disconnected, a loop protection mechanism is enabled to recover communication between each node in the loop network.

Each transmission node in the loop monitors its own port link state in real time. When a certain link in the loop fails, nodes at two ends of the link detect that the port is down, and a corresponding control protocol message should be sent immediately from another failure-free port to notify the master node of this change. After receiving this message, the master node invokes a forwarding data function of a slave port, and notifies each transmission node in the loop to refresh its own media access control (MAC) address list. When a node adjacent to a failed link detects link failure recovery, it will block immediately the data message forwarding function of the port just recovered and enter into a pre-forwarding state where the port can forward control protocol messages instead of protection VLAN data messages. At this time, a HELLO message which is sent by the master node periodically can be returned to the slave port of the master node through a control VLAN loop. Thus, the master node considers that the link is recovered, and re-blocks the protection VLAN data forwarding function of the slave port, and sends the corresponding control protocol message from a master port to notify the transmission nodes in the loop that the link is recovered and notify the transmission nodes to refresh their respective MAC address lists. A port which is in the pre-forwarding state receives this message and changes the pre-forwarding state to a forwarding state, while invoking the protection VLAN data forwarding function of the port.

In such a failure detection and recovery mechanism, the node adjacent to the failed link detects the recovery of the link, and immediately prevents the corresponding port from entering into the pre-forwarding state. After the master node perceives the recovery of the link, the control protocol message (which is used to notify the transmission nodes in the loop to refresh addresses and trigger state switching of the corresponding port) is sent by the master port. If this message is lost, the port adjacent to the recovered link will be always in the pre-forwarding state, namely, data messages can not be forwarded, and in the meanwhile the master node also blocks the data forwarding function of the slave port, thereby causing disconnection of the communication link and further resulting in the loss of the data messages.

SUMMARY OF THE INVENTION

The technical problem to be solved in the present invention is to provide a method for controlling failure recovery of Ethernet loop protection and an Ethernet loop node such that a port of a node adjacent to a recovered link can enter into a forwarding state from a pre-forwarding state as early as possible on the premise that a corresponding control protocol message is unable to be received in time, thereby efficiently avoiding traffic loss due to a port adjacent to a failed link being unable to forward data messages in time.

In order to solve the above problem, the present invention provides a method for controlling failure recovery of Ethernet loop protection comprising:

when a node adjacent to a failed link detects recovery of the link, blocking a port which is just recovered, setting the port to be in a pre-forwarding state and starting a timer, and releasing the port temporarily blocked if the node adjacent to the failed link has not received a control protocol message sent by a master node during a timing period of the timer, and transferring the port from the pre-forwarding state to a forwarding state.

Further, the method can also comprises:

if the node adjacent to the failed link receives the control protocol message sent by the master node during the timing period of the timer, the node adjacent to the failed link releasing the port temporarily blocked, and transferring the port from the pre-forwarding state to the forwarding state, and turning off the timer.

Further, in the method, the control protocol message sent by the master node is a message for notifying each transmission node to refresh addresses.

Further, in the method, the pre-forwarding state of the port means that in this state, the port forwards only control protocol messages instead of data messages in a protection Virtual Local Area Network (VLAN).

The present invention also provides an Ethernet loop node comprising a port for receiving and transmitting messages, a message receiving unit, a message transmitting unit, a detecting unit, a control unit, and a timing unit.

The detecting unit is configured to notify the control unit when link recovery is detected.

The control unit is configured to, after reception of a notification sent by the detecting unit, block a port just recovered, set the port to be in a pre-forwarding state and start the timing unit, and release the port temporarily blocked if it is determined that no control protocol message sent by a master node is received during a timing period of the timing unit, and transfer the port from the pre-forwarding state to a forwarding state.

The timing unit is configured to time.

Further, in the Ethernet loop node, the control unit is also configured to, after starting the timing unit, release the port temporarily blocked if the control protocol message sent by the master node is received during the timing period of the timer, transfer the port from the pre-forwarding state to the forwarding state, and turn off the timing unit.

Further, in the Ethernet loop node, the control unit receives the control protocol message sent by the master node through the message receiving unit.

Further, in the Ethernet loop node, the control protocol message received by the message receiving unit is a message for notifying each transmission node to refresh addresses.

Further, in the Ethernet loop node, the pre-forwarding state set for the port by the control unit means that in this state, the message transmitting unit forwards control protocol messages instead of data messages in a protection Virtual Local Area Network (VLAN).

Compared with the prior art, using the present invention can efficiently avoid the problem of traffic loss due to the corresponding port being unable to enter into the forwarding state in time, which is caused by loss of the control protocol message (which is used to notify the transmission node in the loop to refresh addresses and trigger state switching of the corresponding port) sent by the master node.

PREFERRED EMBODIMENTS OF THE PRESENT INVENTION

The present invention will be further described in conjunction with the accompanying drawings and specific embodiments.

Figure 1:
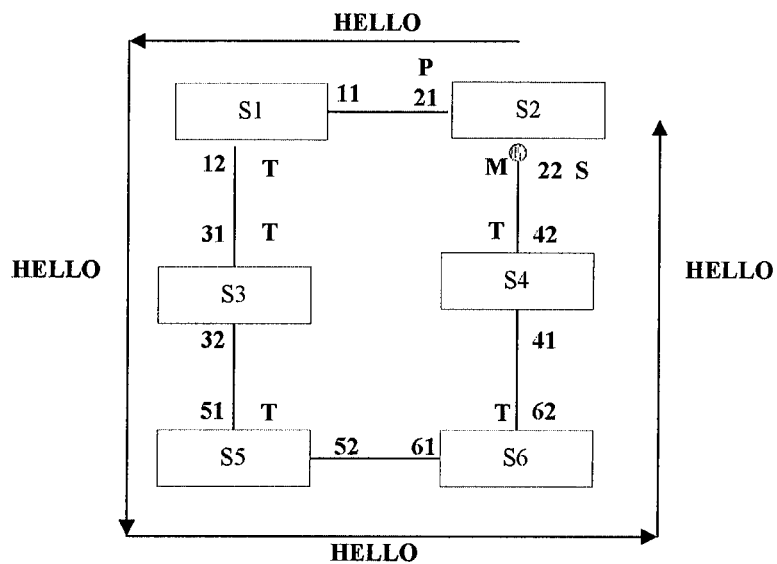
FIG. 1 is a schematic diagram of a failure-free state of the Ethernet.

FIG. 1 is a schematic diagram of a failure-free state of the Ethernet, wherein S2 is configured as a master node of an Ethernet loop, and all the remaining nodes are transmission nodes. Normally, in order to prevent data messages forming a broadcast loop, the master node should block the protection VLAN forwarding function of its slave port (22 in FIG. 1) such that data in the protection VLAN can not pass through this port. In order to check network health periodically, the master node will sent periodically HELLO messages from its master port through each transmission node in sequence and finally back to the master node from the slave port of the master node. In FIG. 1, master node S2 sends the HELLO messages periodically, and because there is no failure in the loop, the HELLO messages arrive at the slave port of the master node through the loop and return to the master node.

Figure 2:
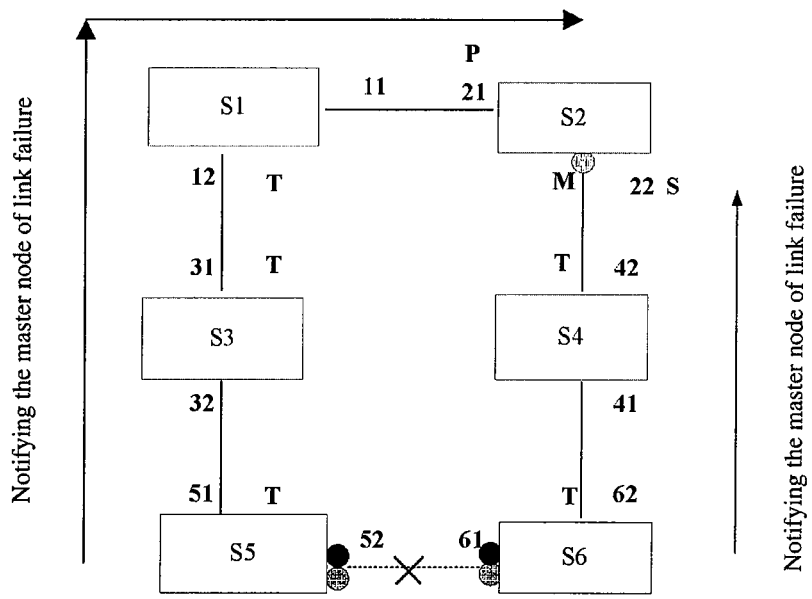
FIG. 2 is a schematic diagram of a link failure situation of the Ethernet.

FIG. 2 is a schematic diagram of a link failure situation of the Ethernet. Each transmission node in the Ethernet loop monitors its own port link state in real time. When a certain link in the loop fails, nodes at two ends of the link detect that the port is down, and a corresponding control protocol message should be sent immediately from another failure-free port to notify the master node of this change. In FIG. 2, a failure occurs in the link between nodes S5 and S6, and after detecting that the link corresponding to the port fails, nodes S5 and S6 block the port corresponding to the failed link, and respectively send the corresponding protocol message from another port to notify the master node that the link fails. After receiving this message, the master node considers that a failure occurs in the loop. The master node invokes the data forwarding function of a slave port, and notifies each transmission node in the loop to refresh its own media access control (MAC) address.

FIG. 3 is a schematic diagram of link failure recovery of the Ethernet.

Figure 3A:
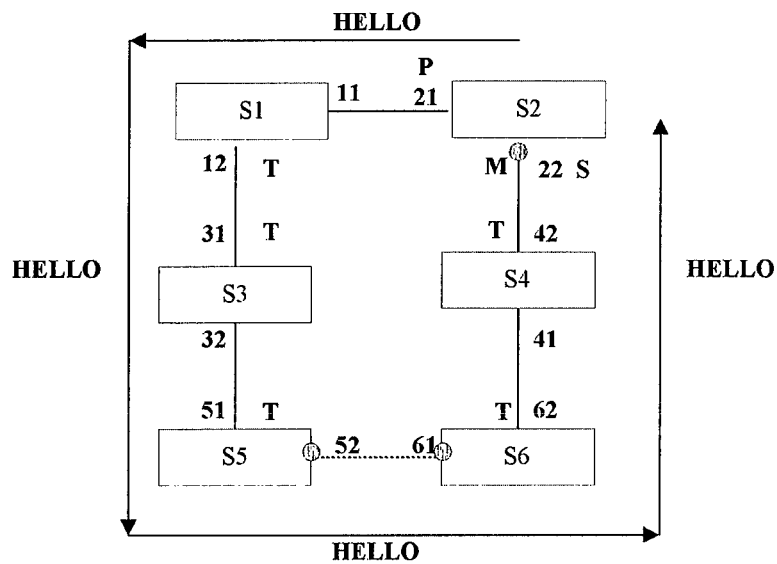
FIG. 3a and FIG. 3b are schematic diagrams of two stages for link failure recovery of the Ethernet.

FIG. 3a illustrates that when a node adjacent to a failed link detects failure recovery of the link, the node will block immediately the data message forwarding function of a port just recovered and enter into a pre-forwarding state where the port can forward control protocol messages instead of protection VLAN data messages such that HELLO messages periodically sent by a master node can be returned to a slave port of the master node through the loop.

Figure 3B:
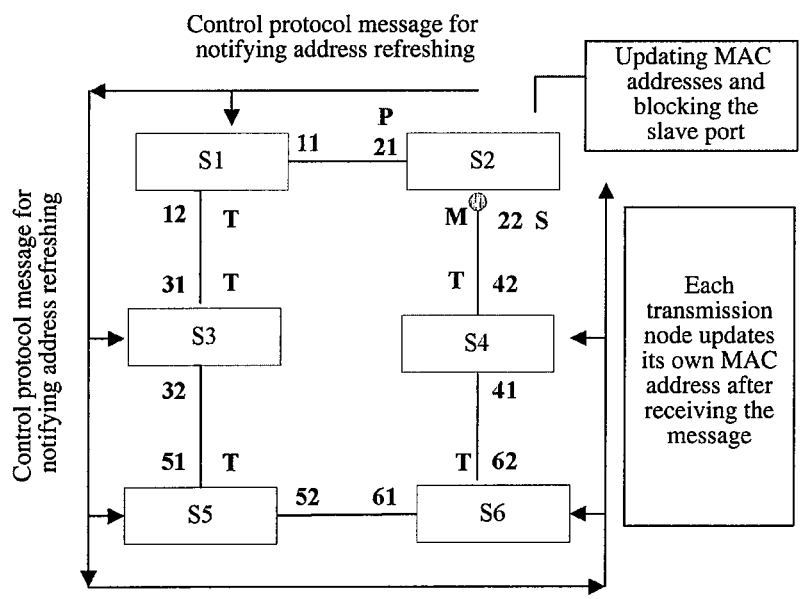

FIG. 3b illustrates that the master node receives the HELLO messages sent by itself at the slave port, considers that the link is recovered, re-blocks the protection VLAN data forwarding function of the slave port, and sends a corresponding control protocol message from the master port to notify the transmission nodes in the loop that the link is recovered and notify the transmission nodes to refresh their respective MAC address lists. The port which is in the pre-forwarding state receives this message and changes the pre-forwarding state to a forwarding state, while invoking the protection VLAN data forwarding function of the port.

Figure 4:
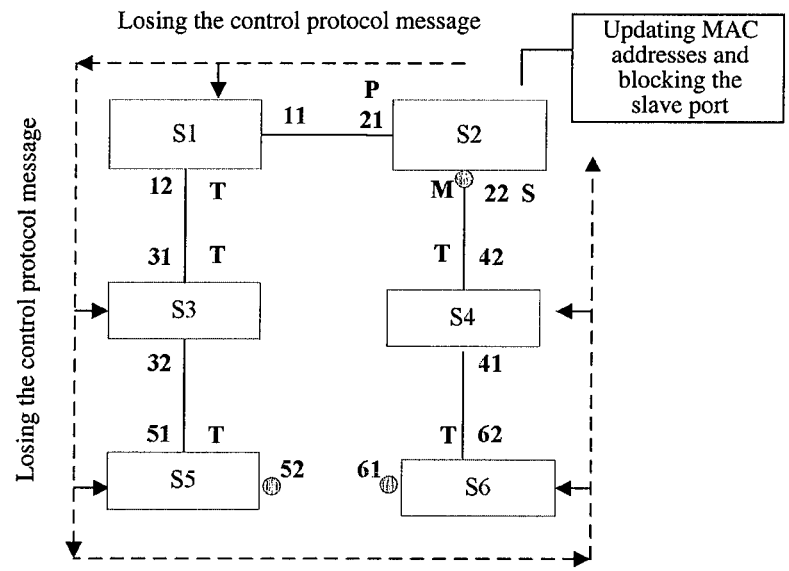
FIG. 4 is a schematic diagram of an error situation caused by loss of the corresponding control protocol message after failure recovery.

FIG. 4 is a schematic diagram of an error situation caused by loss of the corresponding control protocol message after failure recovery. If the control protocol message, which is used for notifying transmission nodes in the loop of recovery of the link (address refreshing), sent by the master port of the master node is lost, then the port adjacent to the recovered link will be always in the pre-forwarding state, namely, data messages can not be forwarded, and in the meanwhile the master node also blocks the data forwarding function of the slave port, thereby causing disconnection of the communication link and further resulting in the loss of the data messages.

The main concept of the present invention is that when a node adjacent to a failed link detects recovery of the link, it blocks the port which is just recovered, sets the port to be in a pre-forwarding state and starting a timer, and if the node adjacent to the failed link has not received a control protocol message (address refreshing) sent by a master node during a timing period of the timer, it releases the port temporarily blocked, and transfers this port from the pre-forwarding state to a forwarding state.

Figure 5:
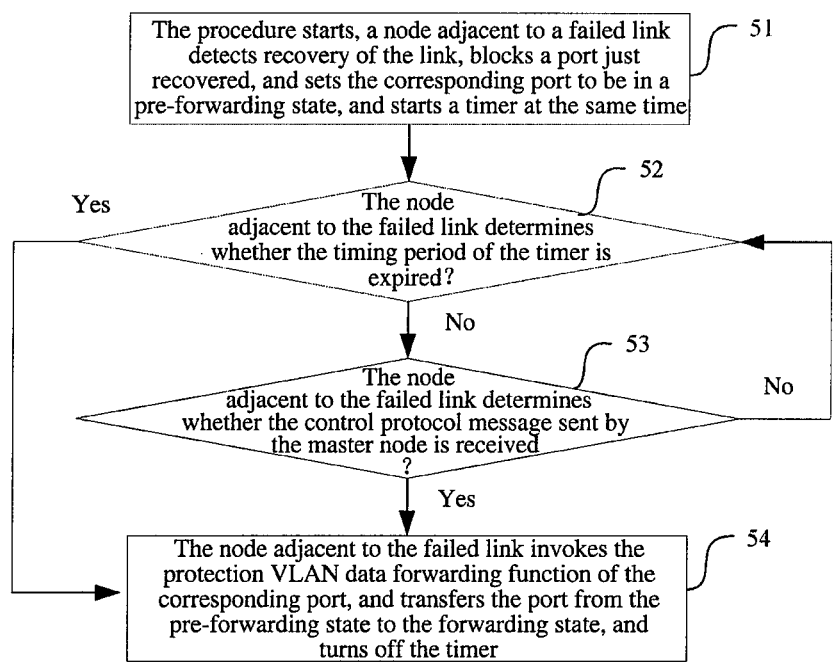
FIG. 5 is a flow chart of a method for controlling failure recovery of Ethernet loop protection according to the present invention.

As shown in FIG. 5, a method for controlling failure recovery of Ethernet loop protection comprises following steps:

Step 51: the procedure starts, and a node adjacent to a failed link detects recovery of the link, blocks a port just recovered, and sets the corresponding port to be in a pre-forwarding state, and starts a timer at the same time.

The node adjacent to the failed link detects the recovery of the link, sets the corresponding port to be in the pre-forwarding state and starts the timer at the same time to provide a guarantee mechanism for state switching (switching from the pre-forwarding state to the forwarding state) of the corresponding port.

Step 52: the node adjacent to the failed link determines whether the timing period of the timer is expired, if yes, step 54 is performed, otherwise, step 53 is performed.

Step 53: the node adjacent to the failed link determines whether the control protocol message, which is used for notifying each transmission node to refresh addresses, sent by the master node is received, if this message is received, step 54 is performed, if this message is not received, step 52 is performed.

Step 54: the node adjacent to the failed link invokes the protection VLAN data forwarding function of the corresponding port, and transfers the port from the pre-forwarding state to the forwarding state, and turns off the timer.

An Ethernet loop node comprising a port for receiving and transmitting messages, a message receiving unit, a message transmitting unit, a detecting unit, a control unit and a timing unit is provided.

The detecting unit is configured to notify the control unit when link recovery is detected.

The control unit is configured to, after reception of a notification sent by the detecting unit, block a port just recovered, set the port to be in a pre-forwarding state and start the timing unit, and release the port temporarily blocked if it is determined that no control protocol message sent by a master node is received during a timing period of the timing unit, and transfer the port from the pre-forwarding state to a forwarding state.

The timing unit is configured to time.

The control unit is further configured to, after starting the timing unit, release the port temporarily blocked if the control protocol message sent by the master node is received during the timing period of the timer, transfer the port from the pre-forwarding state to the forwarding state, and turn off the timing unit.

The control unit receives the control protocol message sent by the master node through the message receiving unit.

The control protocol message received by the message receiving unit is a message for notifying each transmission node to refresh addresses.

The pre-forwarding state set for the port by the control unit means that in this state, the message transmitting unit forwards control protocol messages instead of data messages in a protection Virtual Local Area Network (VLAN)

In this procedure, the setting of the timer efficiently ensures that in the case where the control protocol message sent by the master node is lost, the port corresponding to the failed link can be switched from the pre-forwarding state to the forwarding state in time, avoiding traffic loss due to link disconnection, which is caused by loss of the control protocol message.

The above embodiments are only preferred specific embodiments of the present invention, and the scope of the present invention is not limited thereto. Any variation or substitution within the technical scope disclosed by the present invention, which may occur easily to persons skilled who have acquainted themselves with the art, should be included in the protection scope of the present invention. Therefore, the protection scope of the present invention should be subject to the protection scope of the appended claims.

INDUSTRIAL APPLICABILITY

Compared with the prior art, using the present invention can efficiently avoid the problem of traffic loss due to the corresponding port being unable to enter into the forwarding state in time, which is caused by loss of the control protocol message (which is used to notify the transmission node in the loop to refresh addresses and trigger state switching of the corresponding port) sent by the master node.

I claim:

1. A method for controlling failure recovery of Ethernet loop protection comprising:
when a node adjacent to a failed link detects recovery of the link, blocking a port which is just recovered, setting the port to be in a pre-forwarding state and starting a timer, and releasing the port temporarily blocked if the node adjacent to the failed link has not received a control protocol message used for notifying transmission nodes in the loop of recovery of the link sent by a master node during a timing period of the timer, and transferring the port from the pre-forwarding state to a forwarding state.

2. The method according to claim 1, further comprising:
if the node adjacent to the failed link receives the control protocol message sent by the master node during the timing period of the timer, the node adjacent to the failed link releasing the port temporarily blocked, and transferring the port from the pre-forwarding state to the forwarding state, and turning off the timer.

3. The method according to claim 1, wherein
the control protocol message sent by the master node is a message for notifying each transmission node to refresh addresses.

4. The method according to claim 1, wherein
the pre-forwarding state of the port means that in this state, the port forwards only control protocol messages instead of data messages in a protection Virtual Local Area Network (VLAN).

5. An Ethernet loop node comprising a port for receiving and transmitting messages, a message receiving unit, a message transmitting unit, a detecting unit, a control unit, and a timing unit, wherein:
the detecting unit is configured to notify the control unit when link recovery is detected;
the control unit is configured to, after reception of a notification sent by the detecting unit, block a port just recovered, set the port to be in a pre-forwarding state and start the timing unit, and release the port temporarily blocked if it is determined that no control protocol message used for notifying transmission nodes in the loop of recovery of the link sent by a master node is received during a timing period of the timing unit, and transfer the port from the pre-forwarding state to a forwarding state; and
the timing unit is configured to time.

6. The Ethernet loop node according to claim 5, wherein
the control unit is further configured to, after starting the timing unit, release the port temporarily blocked if the control protocol message sent by the master node is received during the timing period of the timer, transfer the port from the pre-forwarding state to the forwarding state, and turn off the timing unit.

7. The Ethernet loop node according to claim 6, wherein
the control unit receives the control protocol message sent by the master node through the message receiving unit.

8. The Ethernet loop node according to claim 7, wherein
the control protocol message received by the message receiving unit is a message for notifying each transmission node to refresh addresses.

9. The Ethernet loop node according to claim 5, wherein
the pre-forwarding state set for the port by the control unit means that in this state, the message transmitting unit forwards control protocol messages instead of data messages in a protection Virtual Local Area Network (VLAN).

* * * * *